(12) United States Patent
Provanzana et al.

(10) Patent No.: US 6,522,031 B2
(45) Date of Patent: Feb. 18, 2003

(54) POWER LOAD-LEVELING SYSTEM AND PACKET ELECTRICAL STORAGE

(75) Inventors: John H. Provanzana, W. Worthington, OH (US); John M. Schneider, Hilliard, OH (US); Ali Nourai, Dublin, OH (US); Warren W. Walborn, Dublin, OH (US); Brendan J. Ware, Columbus, OH (US)

(73) Assignee: American Electric Power Company, Inc., Columbus, OH (US)

( * ) Notice: Subject to any disclaimer, the term of this patent is extended or adjusted under 35 U.S.C. 154(b) by 8 days.

(21) Appl. No.: 09/974,240

(22) Filed: Oct. 10, 2001

(65) Prior Publication Data

US 2002/0041126 A1 Apr. 11, 2002

Related U.S. Application Data

(60) Provisional application No. 60/239,560, filed on Oct. 10, 2000.

(51) Int. Cl.[7] .................................................. H02J 3/32
(52) U.S. Cl. ........................... 307/48; 307/43; 307/64; 307/80; 307/82; 307/84
(58) Field of Search ............................. 307/48, 64, 82, 307/84, 80, 43

(56) References Cited

U.S. PATENT DOCUMENTS

| | | | |
|---|---|---|---|
| 3,831,373 A | 8/1974 | Flynt | 60/39.33 |
| 3,939,356 A | 2/1976 | Loane | 290/52 |
| 3,996,741 A | 12/1976 | Herberg | 60/398 |
| 4,085,333 A | 4/1978 | Grise | 290/2 |
| 4,118,637 A | 10/1978 | Tacken | 290/55 |
| 4,124,805 A | 11/1978 | Jacoby | 290/1 R |
| 4,140,959 A | 2/1979 | Powell | 322/100 |
| 4,206,608 A | 6/1980 | Bell | 60/698 |
| 4,275,310 A | 6/1981 | Summers et al. | 290/1 R |
| 4,353,214 A | 10/1982 | Gardner | 60/652 |
| 4,599,677 A * | 7/1986 | Lawless et al. | 361/321 |
| 4,680,671 A | 7/1987 | Brion et al. | 361/329 |
| 4,797,566 A | 1/1989 | Nozaki et al. | 307/43 |
| 4,849,648 A | 7/1989 | Longardner | 290/54 |
| 4,894,764 A | 1/1990 | Meyer et al. | 363/65 |
| 5,184,058 A | 2/1993 | Hesse et al. | 320/4 |
| 5,500,561 A | 3/1996 | Wilhelm | 307/64 |
| 5,537,822 A | 7/1996 | Shnaid et al. | 60/659 |
| 5,610,802 A | 3/1997 | Elder et al. | 361/831 |
| 5,686,766 A | 11/1997 | Tamechika | 307/43 |
| 5,917,251 A | 6/1999 | Schermann et al. | 307/20 |
| 6,026,349 A * | 2/2000 | Heneman | 307/60 |
| 6,134,124 A * | 10/2000 | Jungreis et al. | 363/34 |
| 6,194,794 B1 | 2/2001 | Lampe et al. | 307/68 |
| 6,219,623 B1 | 4/2001 | Wills | 702/60 |
| 6,222,723 B1 | 4/2001 | Razoumov | 361/503 |
| 6,297,977 B1 | 10/2001 | Hugett et al. | 363/65 |
| 6,331,282 B1 * | 12/2001 | Manthiram et al. | 423/599 |

* cited by examiner

*Primary Examiner*—Stephen W. Jackson
*Assistant Examiner*—Robert L. DeBeradinis
(74) *Attorney, Agent, or Firm*—Standley & Gilcrest LLP

(57) ABSTRACT

A large scale, capacitor-based electrical energy storage and distribution system capable of effectuating load-leveling during periods of peak demand on a utility. A capacitor or multitude of capacitors may be charged with electrical energy produced by the utility during periods of low demand, such as the evening hours, and discharged during periods of high electrical energy consumption to help reduce demand on the utility. One or more capacitors may be located at a consumer's residence or business for providing at least a portion of the consumer's electrical power requirements. Alternatively, a farm of capacitors may be provided at or near a utility, or at or near a location experiencing high demand, such that electrical energy stored in the capacitors can be discharged into the utility's distribution grid to increase the amount of electrical energy available for use.

69 Claims, 9 Drawing Sheets

POWER LOAD-LEVELING SYSTEM AND PACKET ELECTRICAL STORAGE

This Application claims the benefit of U.S. Provisional Application No. 60/239,560, filed on Oct. 10, 2000.

BACKGROUND AND SUMMARY OF THE INVENTION

The present invention relates generally to electrical energy supply and distribution, and more particularly, to a power load leveling system including energy packet storage components. Electrical energy generation and distribution has been a mainstay for residential and commercial energy needs for societies all over the world for many years. Various forms of electrical energy generation have existed for some time now, including coal fired power plants, nuclear power plants, hydro-electric plants, wind harness plants, and others. All of these forms of electrical energy generation are well known to those of skill in the art of power generation and details of their operation need not be set forth herein. Many volumes of published literature exist on all of these well known forms of electrical power generation, from sources all over the world.

As power generation has advanced power usage has increased. This is due to many societal factors. First, populations in practically every country of the world have increased, resulting in more power needs. Second, consumer products frequently are designed to use electrical energy in order to operate. Due to advances in technology, more electronic products are available for use today than at any time in world history. Third, manufacturing plants have realized that machine automation can increase plant productivity and decrease production costs. Such automation usually requires electrical energy. Thus, the overall result is a greater need for electrical energy than ever before.

Another common occurrence around the world related to energy consumption, is that consumption is greater during certain hours of the day. In any given time zone, electrical energy usage is greatest during the hours of 6 AM and 10 PM, commonly referred to as the "awake hours" or waking hours. Between 10 PM and 6 AM the next day most people are sleeping and, therefore, using less electrical energy. These hours are commonly called the "sleeping hours". In order to avoid energy "brownouts", or worse yet "blackouts", power companies have to be able to meet "peak demand" requirements of any given 24 hour day. These peak demand requirements occur during the awake hours and historical data obtained from tracking energy usage can fairly accurately predict how much energy will be needed each hour of each day in practically any community. Therefore, peak demand is one of the main drivers of the size and number of power plants needed for any given area.

The problem with using peak demand requirements to determine power plant capacity, is that it does not make for efficient use of the resulting power plant. For example, if a peak demand period in a given area is X kilowatt-hours and that demand is only required for a period of eight hours each day, and the average demand for the rest of the day is half of X, then the design capacity of that power plant for the other sixteen hours of each day is not being effectively utilized. Said another way, if the full energy production capacity of each power plant, for each day, was utilized, less power plants would be needed because each one would be fully utilized, all day, every day. Design and usage could then be based on total energy needs each day rather than peak demand needs. Using peak demand requirements also results in an inefficient use of the distribution and transmission systems used by the power plants to deliver the electrical energy they produce.

The present invention enables power load leveling throughout each day. Load leveling is the balancing of energy production at a power plant so that the plant is generating about the same amount of energy for all hours of operation, while supplying its customers with their full energy needs throughout the day. Since peak demand periods will likely continue to exist, load leveling may be accomplished by the use of energy storage devices. In other words, by producing energy and storing that energy during low demand periods, such as during sleeping hours, the stored energy can be used during peak demand periods to offset the amount of energy that must be produced during the peak demand periods.

In accordance with one embodiment of the present invention, energy production is made more level throughout each day. At night, for example, energy is produced and stored in specialized capacitors, which may be located at or near a power plant or a power substation, for example. The next day the stored energy may be injected into a utility's power distribution and transmission grid to supply all or part of the energy needs in, for example, a given home, business, or area that is connected thereto. By using the stored energy during peak demand periods, less energy is needed in real time production from the power plant servicing that area. In other embodiments of the present invention, the capacitors may be constructed to be placed in a home, such as in a basement or nearby out building. Larger capacitor-based energy storage systems may be placed in or near a business office or factory. Conversely, it is also possible to produce such systems on a smaller scale for installation at individual loads, such as, for example, in copy machines, PC's, servers, or a multitude of other equipment that requires a supply of electrical energy to operate. Preferably, whether the capacitor-based energy storage systems are placed near the end user of the system or at a power production or distribution location, the systems are of modular construction to allow for efficient set-up, expansion, and repair. Modularity is preferably maintained at both the source and load side of each system. In any of these embodiments, the present invention enables stored electrical energy to be used during peak demand periods to lessen the reliance on real time, direct electrical energy supplied and distributed by a power plant.

The present invention may be accomplished by conventional energy distribution equipment being connected to capacitors of high energy storage capability, wherein the capacitors may be "charged" with energy produced at a power plant as often as desired. The power plant that supplies the charging energy to the capacitors may be a conventional fossil-fuel burning or nuclear power plant, or may consist of an alternate power source, such as, for example, a solar, wind, or hydroelectric source. Unlike known energy storage systems, such as battery storage systems, the capacitors of the present invention allow for the direct storage of large amounts of electrical energy. Capacitors are electrostatic devices that can store and transfer electrical energy directly and, as such, do not require the transpiration of a chemical reaction in order to generate electrical energy, as do batteries. Additional conventional electrical equipment may be used to connect the capacitor(s) to the home, business, or area being serviced, and to transfer the electrical energy from the charged capacitor(s) to an end use. The electrical energy supplied by the capacitors may be delivered in DC form, or may be delivered as single-phase or multi-phase AC. Converter/inverter equipment is preferably provided to properly alter the form of the electrical energy provided to, and drawn from, the capacitors.

In the present invention, specialized capacitors are used to facilitate the above-described system. In one embodiment of the present invention, the capacitor may be of the electrochemical variety, and either symmetrical or asymmetrical in design. The electrochemical capacitor enables significant, direct electrical energy storage in heretofore unmatched, small unit sizes. Other embodiments of the present invention may employ, for example, electrolytic, or cryogenic capacitors that can also provide the desired energy storage.

An inherent benefit of the present invention is the ability to substantially reduce or even eliminate anomalies such as power "surges", "spikes", and "skips", thereby improving what is generally referred to as "power quality". These phenomena are the unfortunate, and practically unavoidable result of moving electrical energy (i.e., electrons) over miles of distribution and transmission lines to end users. Power quality problems can occur for a number of reasons including, for example, electrical system design errors, electrical system construction errors, grounding errors, harmonics and load interactions. While these anomalies are not very common when one considers the total amount of energy delivered each day to any area, they nevertheless can result in significant problems for end users. For example, in this age of computer usage, an energy spike or skip, however brief, can cause electronic documents to be lost, or worse yet, can cause computer system damage. In contrast to the concept of electrical energy storage described above, the electrical energy that must be provided for maintaining power quality is extremely brief in duration. For example, it has been found that most power quality phenomenon occurs within 1 AC cycle or less, and that 10 cycles is usually more than sufficient to relax any momentary disturbance in the supply voltage. Thus, for purposes of the present application, power quality maintenance or improvement is generally defined to mean the ability of the present invention to provide a required level of power output for 1 second or less. When used for power quality purposes, the electrical energy stored in the capacitor(s) is preferably not depleted. This function is converse to the electrical energy storage function, wherein the energy storage system of the present invention may be operated to provide substantially more long-term power to a load or loads, and wherein the capacitor(s) may be discharged until the energy reserves thereof are substantially depleted or until manually shut off. Thus, although electrical energy storage and power quality maintenance are distinguishable tasks, the system of the present invention can operate to effectuate both. For example, one embodiment of the present invention provides an on-site capacitor(s) to directly service the energy needs of that site using stored energy instead of real-time, direct supply energy. The use of the stored energy from the capacitor(s) may be used not only to supply the power requirements of loads at the site, but may also be used to ensure power quality through the short duration discharge of electrical energy in response to power quality disturbances. Similarly, an off-site system according to the present invention may be used to achieve the same effect. Consequently, it should be realized by one skilled in the art that the system of the present invention may typically be collaterally utilized to maintain and improve power quality.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein.

DETAILED DESCRIPTION OF PREFERRED EMBODIMENT(S)

Figure 1:
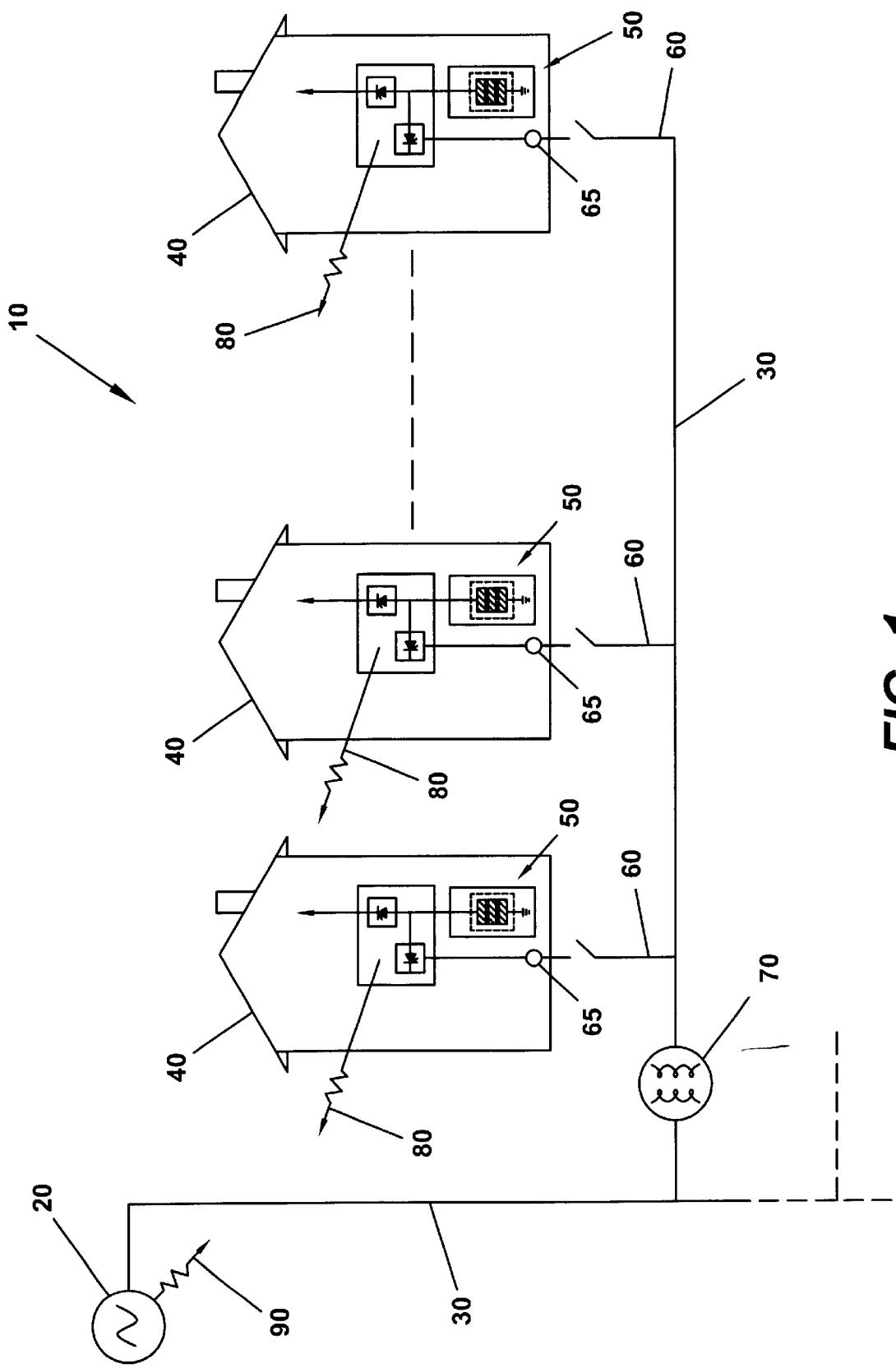
FIG. 1 is a schematic view of one embodiment of the system of the present invention for use with single-phase loads, such as within the homes shown.

Referring now to the drawings and FIG. 1, there is shown a schematic representation 10 of an exemplary embodiment of the present invention. In this embodiment, electrical energy is produced at a power plant 20 and is distributed through conventional energy transmission and distribution lines 30 to homes 40 where a capacitor storage device 50 is located. The power plant 20 may be a conventional fossil-fuel burning or nuclear power plant or, alternatively, may be a solar power, wind power, hydroelectric power, or other alternate power source. Each home may have one or more capacitor storage devices 50, each having one or more capacitors (for example, in the basement of the home) that is electrically connected, such as via a service entrance 60, to the transmission and distribution lines 30 through an electric meter 65 or similar device in order to receive an electrical charge. The electrical charge may be delivered in the form of a "packet" of electrical energy of undetermined size, that is sufficient to store enough energy at a particular capacitor storage device 50 for a given time period of use (for example, the period of awake hours for one day). Delivery of the packet of electrical energy may take place in a relatively short period of time, or alternatively, may be a prolonged process. The capacitor storage device 50 may be wired into the home's internal wiring network (just as conventional electrical supply lines are wired into the same network) to provide all or a portion of the electrical power needed for operation of electrical devices within the home. Such electrical devices may be hardwired into the home's internal wiring network, or may also receive electrical power through conventional electrical wall outlets. Alternatively, or in conjunction with the aforementioned network, certain devices, such as appliances, computers, and other electrical energy consuming devices, may be equipped with individual capacitor storage devices 50 for storing electrical energy. As energy is drawn from the capacitor storage device 50 throughout the day, the capacitor(s) therein is slowly discharged of its stored energy. Later, for example at night during sleeping hours, the capacitor storage device 50 may be re-charged to serve the same purpose the next day. This process may be repeated a multitude of times over a period of years before the capacitor storage device 50 will wear out and have to be replaced.

Figure 2:
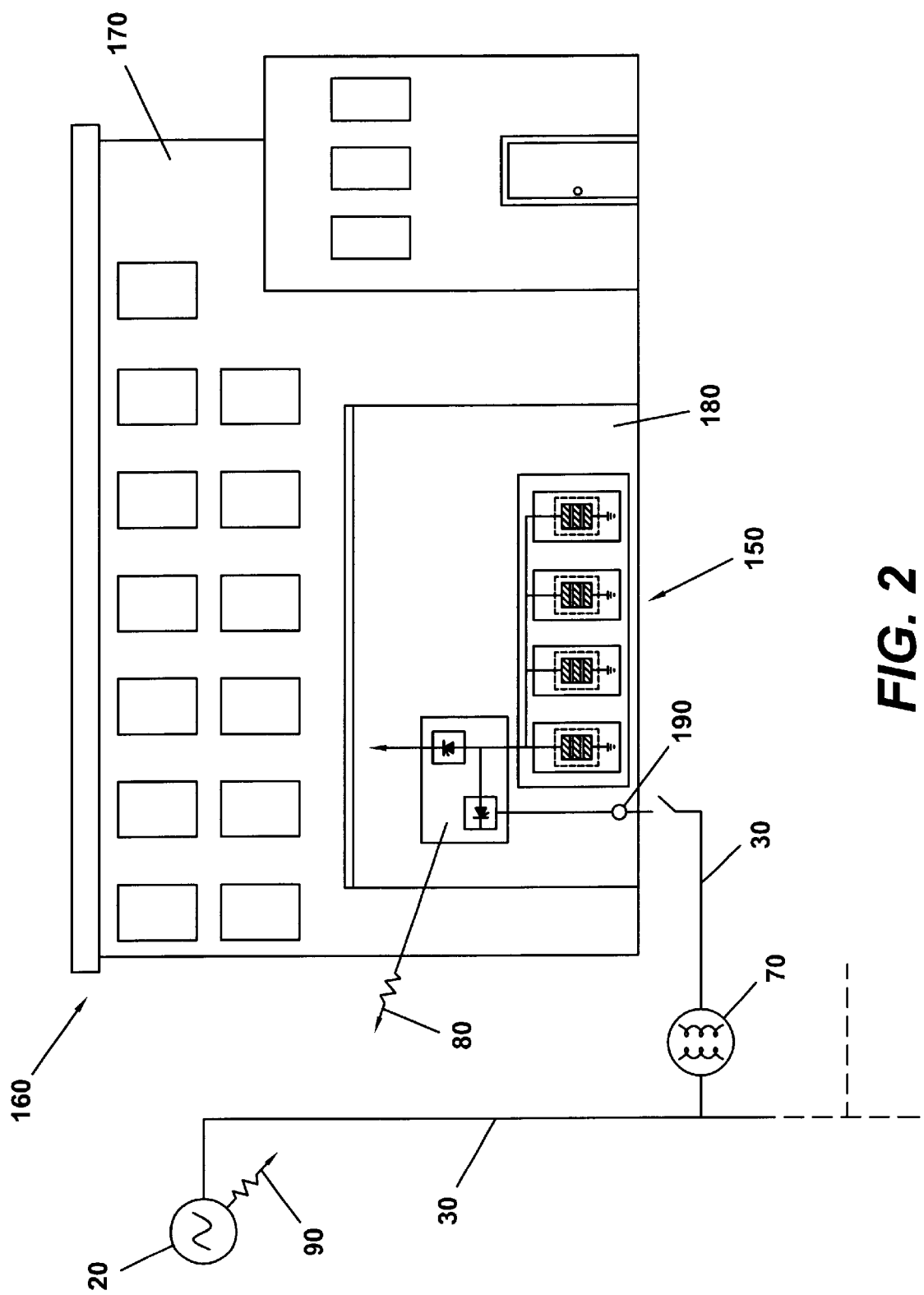
FIG. 2 is a schematic view of another embodiment of the system of the present invention for use with either single-phase or three-phase loads, such as are typically found at a business location.

A commercial application of the present invention can be observed by reference to FIG. 2. In such an application, one or more capacitor storage devices 150 (which may, but do not have to be, larger in size than the capacitor storage devices used at a residence) may be placed at or near a business 160 to supply all or a portion of the energy needs thereof during a typical business day. The capacitor storage devices 150 may be adapted to provide either single-phase or three-phase power to the business 160. Such a business use of the present invention may allow for more flexibility, since businesses may tend to have more room for larger capacitors either inside a main building structure 170 or inside, for example, a secondary building 180.

As in the embodiment of FIG. 1 directed to a residential application, in the embodiment of FIG. 2, electrical energy is again produced at a power plant 20 and distributed through conventional energy transmission and distribution lines 30 to a business 160 where one or more capacitor storage devices 150 are located. Each business may have one or more groups of one or more capacitor storage devices 150, that are electrically connected to the transmission and distribution lines 30 through an electric meter 190 or similar device in order to receive an electrical charge.

Figure 3:
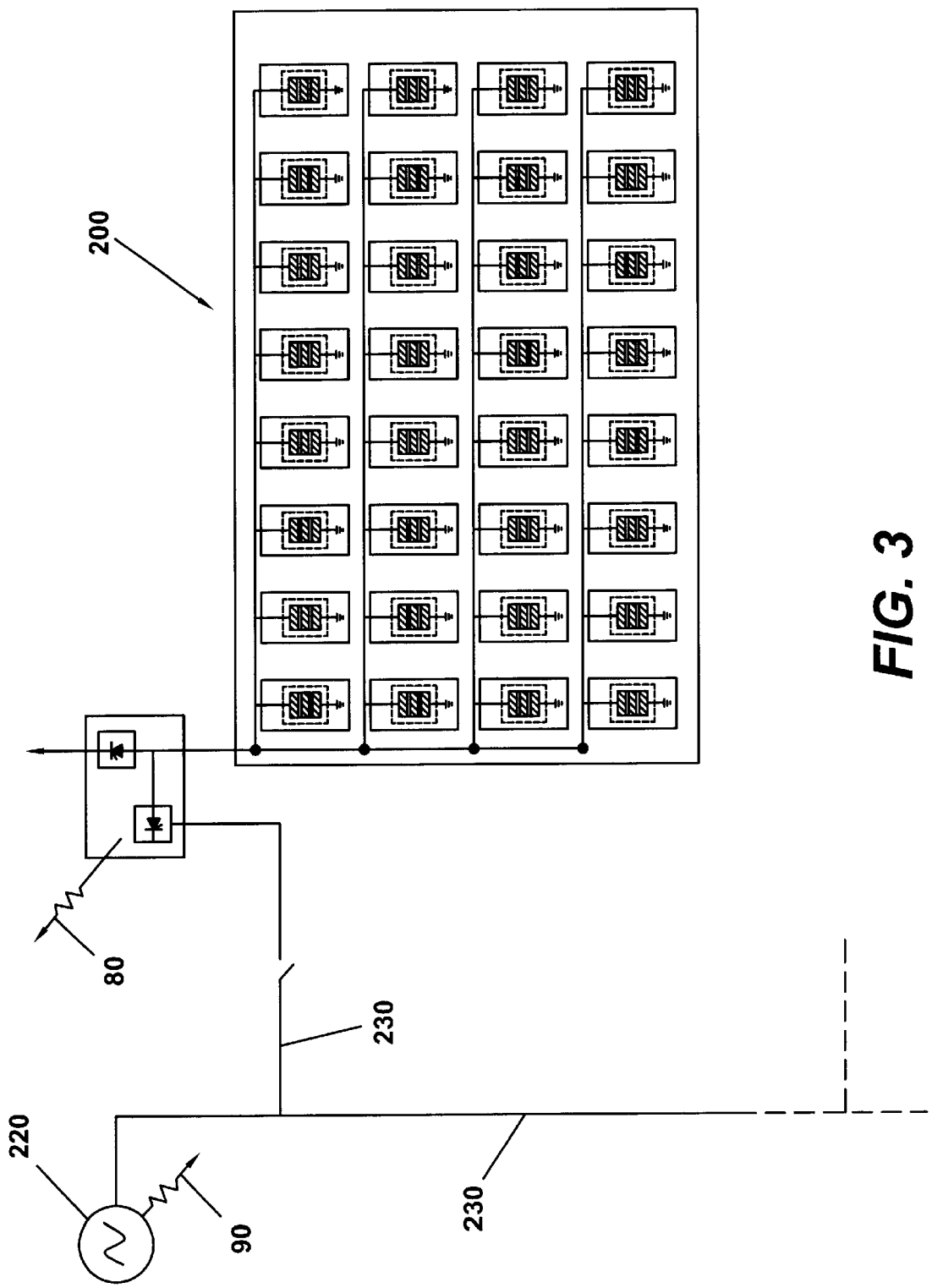
FIG. 3 is a schematic view of yet another embodiment of the system of the present invention representing a farm of capacitors, such as may be located at a power plant, a power substation, or at virtually any location requiring DC or single-phase or multi-phase AC power.

FIG. 3 shows a farm of capacitor storage devices 200 according to the present invention, located at or near either an electrical energy producing power plant 220 site or a power substation. As in the previous embodiments, the power plant may be a conventional fossil-fuel burning or nuclear power plant or, alternatively, may be a solar power, wind power, hydroelectric power, or other alternate power source. In this embodiment of the present invention, power generated at night or during other off-peak hours may be stored at the capacitor farm 200 for later introduction into the utility's power grid during peak demand hours. In this manner the power plant 220 can be more efficiently used by taking advantage of increased power generation capability during off-peak hours, thereby decreasing power generation requirements during peak demand hours and, thus, leveling the load on the power plant. Additionally, load leveling also promotes a more efficient use of the distribution 230 and transmission systems used to deliver the electrical energy. For example, by employing load leveling, individual components such as transformers 70 (FIGS. 1 and 3) could be used to service more end users than is currently possible, thereby reducing equipment and installation costs.

Figure 4:
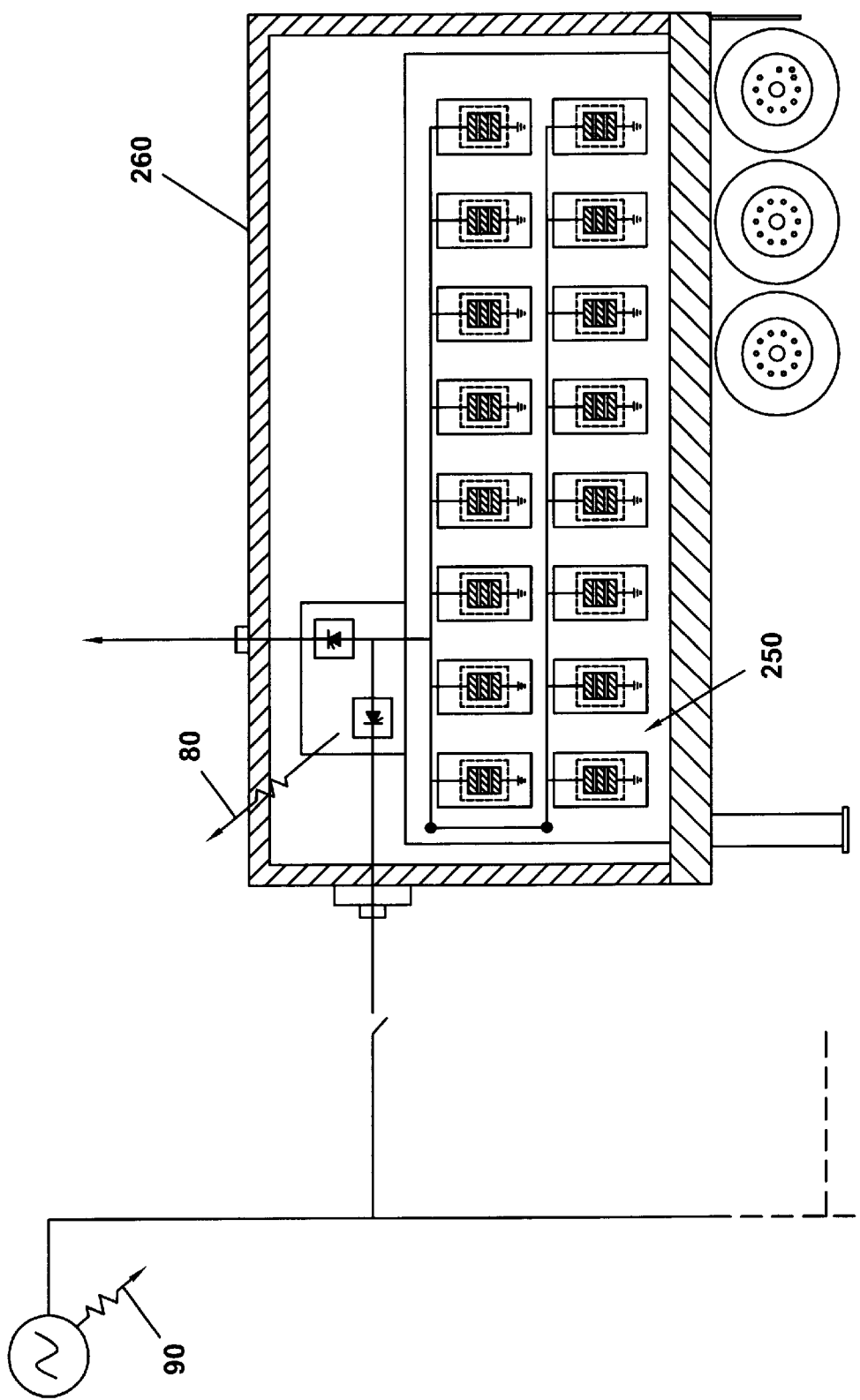
FIG. 4 is a schematic view of an alternate embodiment of the system of the present invention, wherein a group of capacitors is designed to be transportable.

FIG. 4 illustrates another embodiment of the present invention, wherein a group of capacitor storage devices 250 is provided to reside in an enclosure 260 that may be transported to areas requiring load leveling. In this manner, energy storage may be provided closer to areas experiencing problems meeting peak demand. Such a system may be especially useful when, for example, a load leveling system is only needed periodically or for short periods of time, such as to meet demand during periods of extreme weather. A transportable system, therefore, can reduce costs by allowing energy storage to be provided when and where needed without requiring the construction of a permanent energy storage installation and accompanying transmission and distribution lines. Such a transportable system may be located at a power substation for localized distribution via an existing power grid. Such a transportable system may also be located at a particular facility requiring larger than normal amounts of electrical energy.

The group of capacitor storage devices 250 shown in FIG. 4 may be charged at a first location and then transported to one or more different locations and discharged over time. The group of capacitor storage devices 250 may then be returned to the first location to be recharged, may be recharged at the current location or, alternatively, may be transported to a different charging location. It is also possible that the group of capacitor storage devices 250 may deliver their energy to one or more other systems while in transit.

Figure 5:
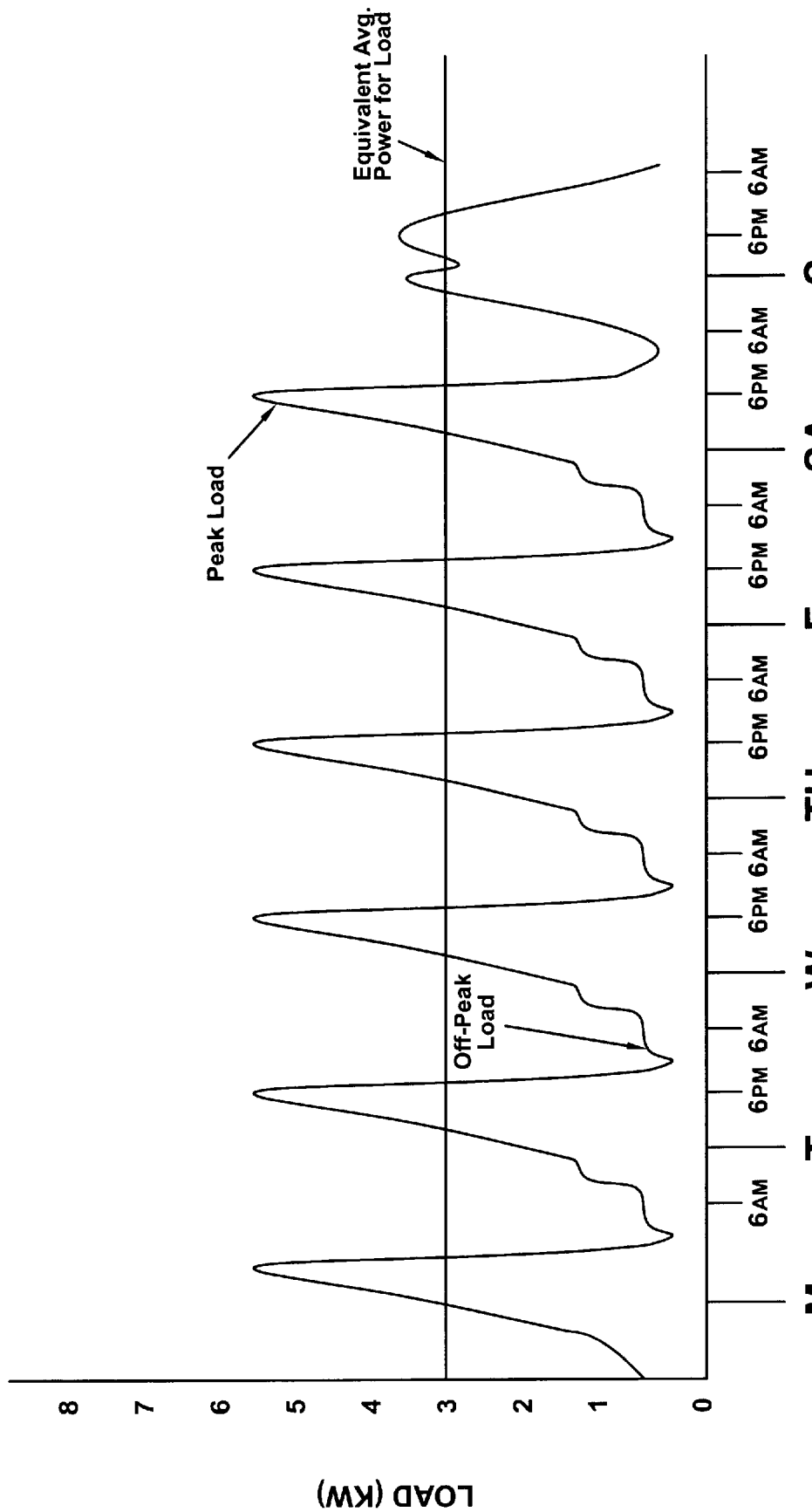
FIG. 5 is a graphical depiction of normal electrical energy load requirements versus peak demand requirements for a given area.

FIG. 5 shows a graph of theoretical peak electrical energy demand loads for a particular week. It can be seen that the energy needs fluctuate greatly during different hours of any given day. The week-long equivalent average power demand is also shown as a straight line. While it may not be possible to achieve uniformly consistent demand, as would be indicated by a straight line graph, the system of the present invention allows for a reduction in peak demand levels and a resulting leveling of the overall energy demand curves for each day.

Figure 6:
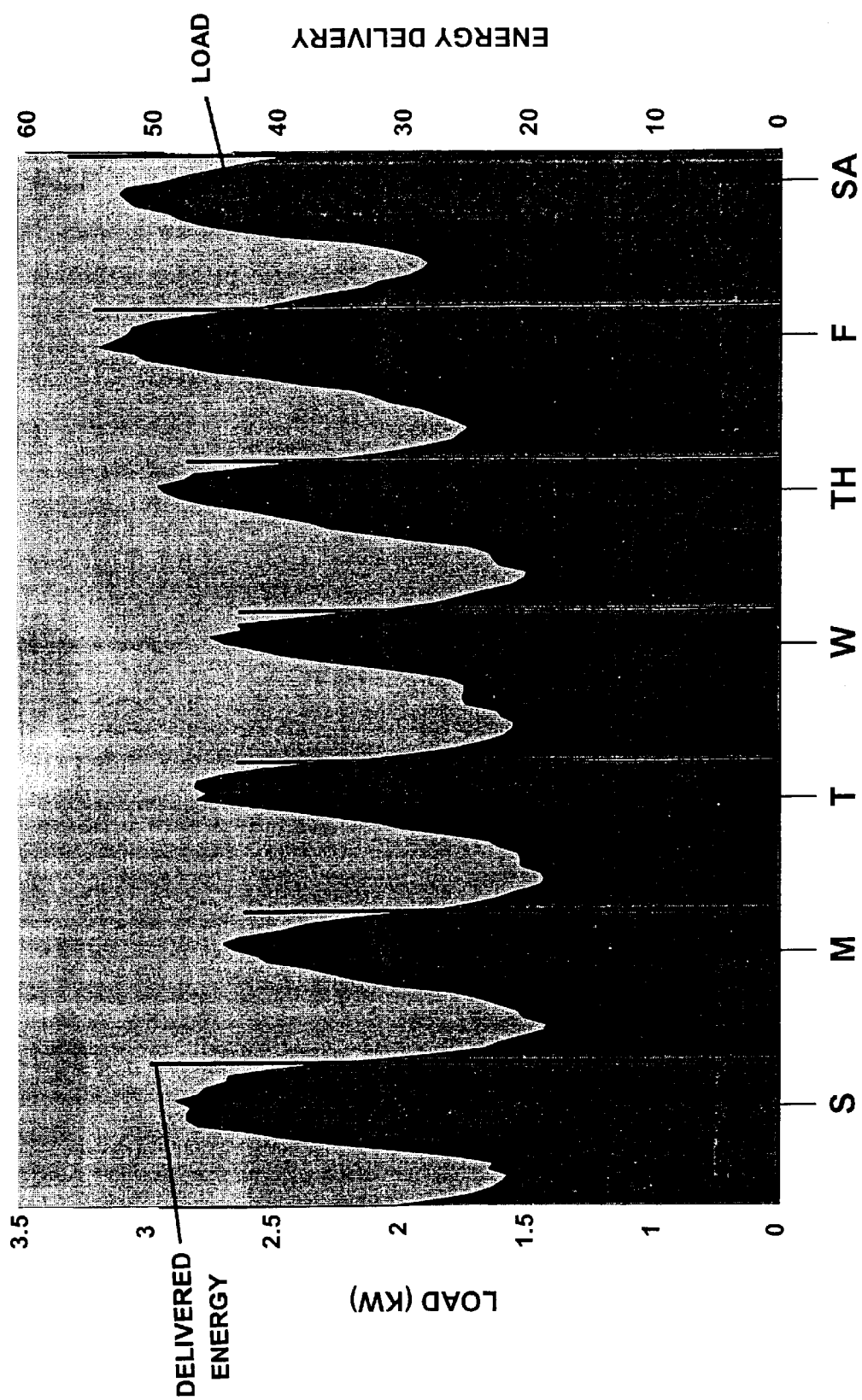
FIG. 6 is a graphical depiction of electrical energy load requirements and electrical energy delivery when the system of the present invention is utilized in a given area.

FIG. 6 represents the actual daily metered energy usage of one customer for a particular week, along with the packet energy delivery that is equivalent to the daily load cycle. The area defined by the shaded portion of the graph represents the actual energy usage (load) for each day of the week. As can be seen, the actual usage during any given day varies widely depending on the time of day. Thus, as other customers serviced by a particular power plant will have similar demand patterns, it can be understood that a power plant supplying such customers must operate at different levels throughout the day to meet demand. As described earlier, this is not a desirable situation. It is more preferable to operate a power plant continuously at or near its optimum output level. The vertical bars of the graph represent the value of a packet of electrical energy that equates to the fluctuating daily load cycle. As can be seen in FIG. 6, the value of the packet of electrical energy far exceeds the maximum load placed on the system by the customer at any given time. However, it should be realized that the additional energy could be used to supply additional users during off-peak hours. Load-leveling may be achieved by aggregating the loads of similar customers such that value of the packet energy delivery is as constant as possible. In this manner, a power generating plant would not have to be designed on the basis of peak demand requirements. Rather, a smaller power plant operating at near optimum efficiency could supply all the energy needs of a particular number of customers that otherwise would require a larger power plant to meet fluctuating daily demand. Similarly, an existing power plant running continuously at or near its optimum level could supply additional customers. For example, in a given area, the peak daily load of a customer multiplied by the number of customers results in a load of 100 MW. Therefore, the power plant that supplies electrical energy to these customers must be designed to have an output that is at least great enough to meet the 100 MW load. However, at many times throughout the day, the demand is lower and the power plant is operated at far below its optimum level. Using the system and method of the present invention, however, a power plant of significantly lower output, operated at or near optimum efficiency 24 hours per day, can meet the same energy demands. Thus, smaller, less costly power plants may be constructed to meet future energy needs. A collateral result of increased power plant efficiency, at least in regard to fossil-fuel burning and possibly nuclear power plants, is a reduction in emissions and corresponding pollution problems. Also, older power plants that may not have the capacity to service current peak demand requirements in a given area, may now be operated in accordance with the present invention to satisfy that area's power needs during all times, including peak demand times. This will result in the construction of fewer new power plants and transmission and distribution lines and, thus, will decrease the cost to supply electricity to consumers; as a significant portion of the energy cost to consumers is associated with utilities recovering the cost of building new power plants and distribution systems.

Figure 7:
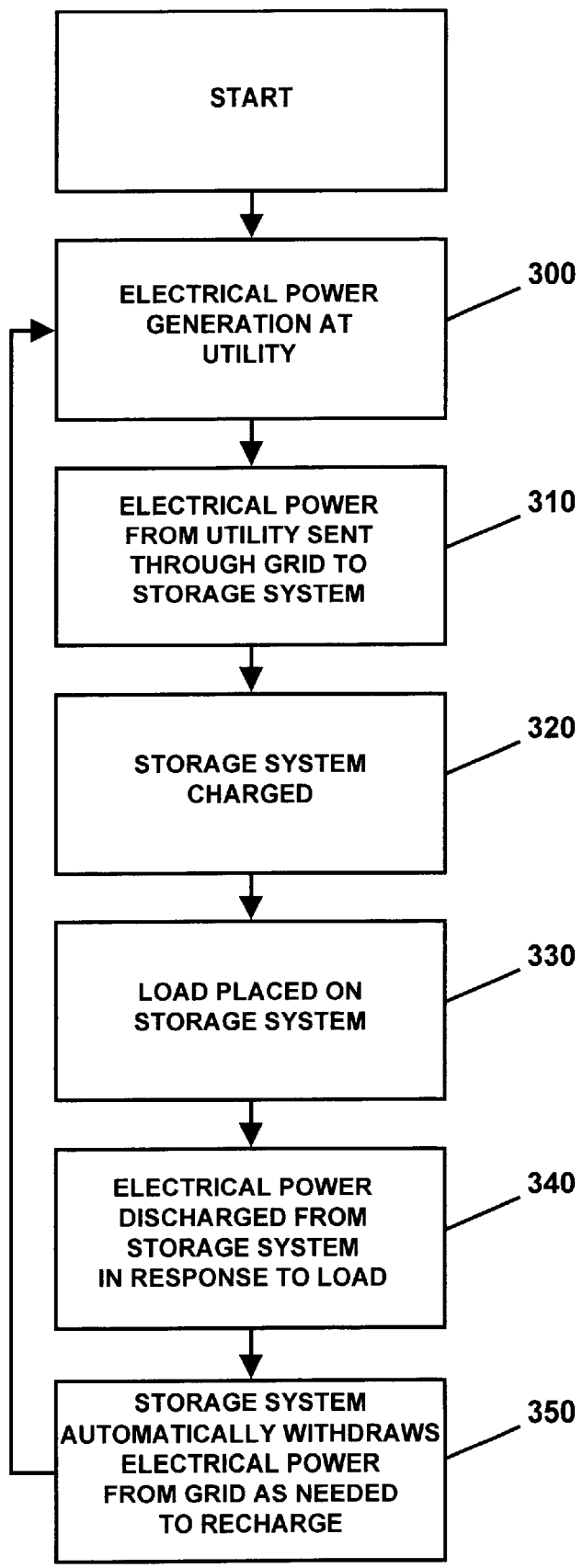
FIG. 7 is a flow chart showing steps of one embodiment of the present invention.

FIG. 7 shows a flow chart of the steps carried out in one embodiment of the present invention. These steps are set forth in the chart and restate the steps described above to make use of the present invention. Electrical energy is generated in traditional or non-traditional ways 300. Some of that electrical energy may be distributed 310 in the form of packets of varying size to charge 320 or store energy in one or more capacitor storage devices. As a customer's energy needs arise, a load 330 is placed on the capacitor storage devices, and the capacitor storage devices are discharged 340 as needed in response thereto. After discharge in whole or in part, the capacitor storage devices may be re-charged 350 for use during the following day (or during some other time interval).

Particular capacitors suitable for use in the present invention will now be described in greater detail with specific reference to FIGS. 8 and 9. It should be recognized by one skilled in the art that the capacitors described herein are not the only such capacitors that may be used with the present invention. The capacitors described herein represent a reasonable mode of practicing the invention as of the filing date of this application. The present invention may be practiced with other varieties of capacitors, both known and as of yet undeveloped and, thus, the present invention is not intended to be limited to a particular capacitor design set forth herein.

Figure 8:
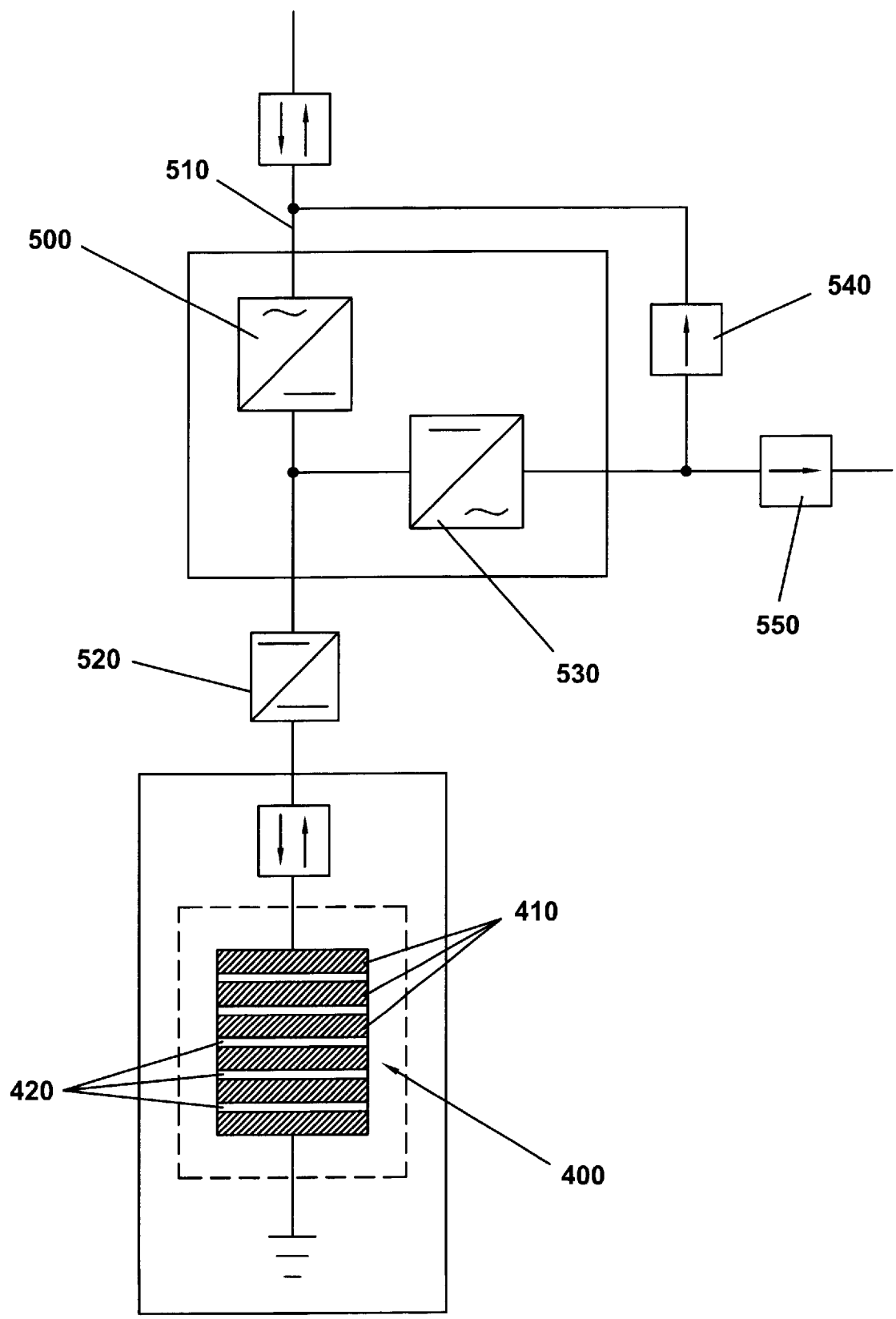
FIG. 8 is a schematic view of one embodiment of a capacitor-based electrical energy storage system of the present invention, using an electrochemical capacitor.

As illustrated in FIG. 8, one or an array of electrochemical capacitors 400 may be used to provide the necessary storage capacity. Although the electrochemical capacitors 400 may be of either a symmetric or asymmetric design, the capacitor of FIG. 8 is preferably asymmetric. Such a capacitor has been generally, previously described in U.S. Pat. No. 6,222,723, which is hereby incorporated by reference herein. In such a capacitor, cells 410 are constructed from a first electrode and a second electrode, which electrodes have a dissimilar absolute capacitance. An aqueous electrolyte is located between the electrodes. This design allows the full capacitance value of the smaller capacitance value electrode to be realized, thereby providing a storage device of high energy storage density. The use of an aqueous electrolyte further improves performance, reduces costs, and provides for non-flammability. In the array 400 shown, the cells 410 are separated by conducting plates 420. The electrochemical capacitors 400 may be of the nickel-metal-hydride variety, but more preferably are of a lead-acid construction in order to provide for a higher charge density.

Figure 9:
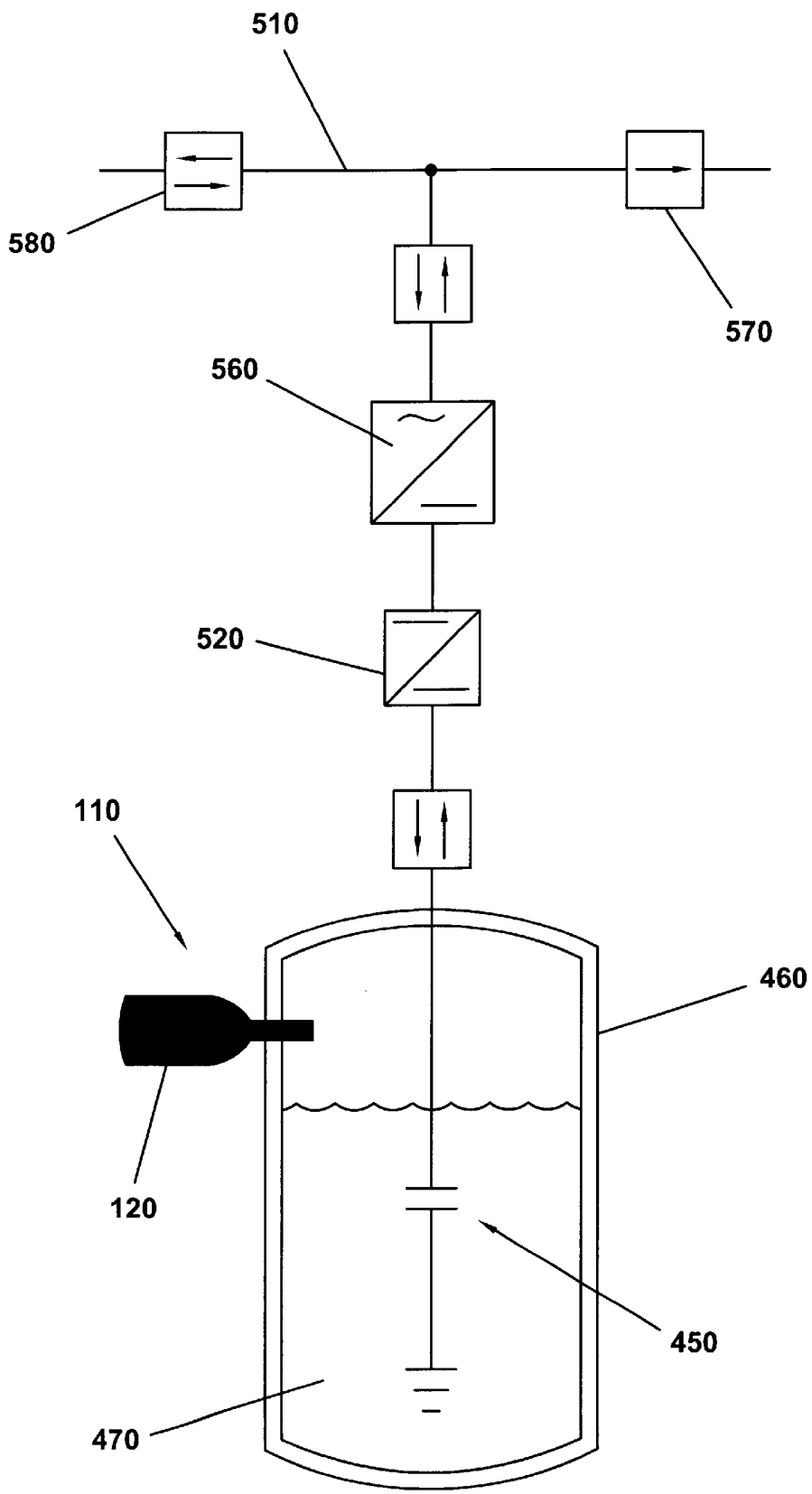
FIG. 9 is a schematic view of one embodiment of a capacitor-based electrical energy storage system of the present invention, using a cryogenic capacitor with a cryogenic cooling subsystem.

In the particular embodiment of the present invention illustrated in FIG. 9, a ceramic capacitor is utilized to store electrical energy. As with the aforementioned electrochemical capacitor design, an array of capacitors 450 may be used to provide the necessary storage. The ceramic capacitors 450 of the present invention are preferably provided with a cryogenic cooling subsystem 110. This capacitor design allows for the direct storage of a large amount of electrical energy in a relatively small capacitor, thereby permitting the present invention to be used, for example, in a home. Such capacitors 450 have been generally, previously described in U.S. Pat. No. 4,599,677 which is hereby incorporated by reference herein. A Stirling-cycle cryo-cooler 120 may be used to drive the cryogenic cooling subsystem 110. The array of capacitors 450 may be housed in a dewar vessel 460 and submerged in liquid nitrogen 470. The cryogenic-cooler subsystem 110 is employed to maintain the liquid nitrogen 470.

The capacitor(s), whatever the design thereof, may receive its energy charge through an AC-DC converter 500 connected to a utility's power distribution and transmission grid 510. Preferably, a bidirectional DC-DC converter 520 is also utilized to accept a DC input from the converter 500 and to provide a regulated DC output to the capacitor(s) for accomplishing the charging thereof. The bi-directional DC-DC converter 520 is preferably also able to transform DC output from the capacitor(s) into a higher DC voltage before conversion to AC voltage by a DC-AC inverter 530. Optionally, the capacitor(s) may output DC voltage to DC electrical devices, without the need for AC/DC conversion. The DC-AC inverter 530 is used to when it is desired to convert the DC output of the capacitor(s) into AC power for delivery to a load.

The system of the present invention can be designed to operate in two basic modes. As can be seen in FIG. 8, the system can be operated in a voltage injection mode having an in-line connection. Electrical energy may be delivered to the capacitor(s) 400 via a power plant's distribution and transmission grid 510 for the charging thereof. In this mode, energy may be withdrawn from the capacitor(s) 400 and either delivered 550 to a specific load, transferred 540 back into the distribution and transmission grid 510 for distribution elsewhere, or may be sent to both locations. During the transfer of electrical energy from the capacitor(s) to a specific load or to the distribution and transmission grid 510, the AC-DC converter 500 is turned off. The second mode of operation is depicted in FIG. 9. In this embodiment, the system operates in a current injection configuration with a shunt connection. As in the mode of FIG. 8, electrical energy can be delivered to the capacitor(s) 450 via the distribution and transmission grid 510 in order to effect the charging thereof. In this mode, a two-way inverter 560 allows electrical energy to be delivered 570 from the capacitor(s) 450 to a specific load, or transferred 580 back to the distribution and transmission grid 510. During charging of the capacitor(s) the two-way inverter acts to convert the AC charging voltage from the distribution and transmission grid 510 into DC voltage for input to the capacitor(s). When discharging the capacitor(s), the two-way inverter 560 operates to convert the DC voltage from the capacitor(s) into AC voltage for transfer to a specific load or back into the distribution and transmission grid 510. It should be understood by one skilled in the art that any capacitor deemed suitable for use in the system of the present invention may effectively operate in either of the modes above described and depicted in FIGS. 8 and 9. Nothing in the written description or drawing figures is meant to suggest that the capacitors shown and/or discussed herein are limited to a particular mode of operation.

Control equipment 80 (FIGS. 1–4) located at or near an individual capacitor storage device or a capacitor storage device array may be used to communicate to a central control device 90 (FIGS. 1–4). The central control device 90 monitors and controls connection of the converter 500 to the power grid 510 to allow the capacitor storage devices 50, 150, 200, 250 to be charged, and to disconnect them from the grid at other times, as needed. The central control device 90 may also facilitate connection of the capacitor storage devices to a distribution and transmission grid and the subsequent withdrawal of electrical energy from the capacitor storage devices into the distribution and power grid. This may be done automatically in order to meet peak demand or in an emergency, for example.

The control equipment 80 and central control device 90 may perform multiple functions. For example, the control equipment 80 and central control device 90 may operate to monitor the fluctuating cost of electrical energy, and to switch between utility supplied electrical energy and stored electrical energy as necessary to maximize cost savings. For example, if the cost of purchasing electrical energy rises dramatically on a given day or over a period of days, but is predicted to drop thereafter, the control equipment may be signaled to connect a charged capacitor storage device or group of charged capacitor storage devices to a load in order to supply the necessary electrical energy thereto, while simultaneously disconnecting the load from the utility's power grid. Thereafter, the capacitor storage devices may supply the required electrical energy to the load until the cost of the electrical energy drops, wherein the load may be reconnected to the utility's power grid and the capacitor storage devices may be recharged. The electrical energy stored in the capacitor storage devices could also be sold to other utilities or, in the case of customer owned systems, may be sold to the supplying utility, other utilities, or other consumers. In the case where electrical energy stored in customer owned systems can be sold back to the generating utility or to another party, the customer may be equipped with a specialized electric meter that can credit the sale of stored electrical energy against the electrical energy the customer has drawn from the utility.

In response to a shortage of electrical energy, the control equipment 80 and central control device 90 may also operate to allocate the distribution of stored electrical energy from one or more capacitor storage devices at one or more locations experiencing the shortage. For example, if a power plant of a utility must be shut down for maintenance or repair, the electrical energy normally supplied by that power plant must be obtained from alternate sources. To this end, the control equipment 80 and central control device 90 may act to determine what areas need to be supplied with electrical energy from alternate sources, and what sources of alternate electrical energy are available. The control equipment 80 and central control device 90 may then act to draw stored electrical energy from one or more capacitor storage devices and to distribute the electrical energy to the areas in need thereof. Such a function may also be performed, for example, when the demand for electrical energy exceeds the supply from traditional sources—such as during peak demand periods.

Once the capacitor storage devices of the present invention are discharged, they must be re-supplied with electrical energy so that they may again be discharged at a later time. The control equipment 80 and central control device 90 can also perform this function. The control equipment 80 and central control device 90 can monitor the status of the capacitor storage devices, as well as the demand on the power grid with which they communicate, in order to determine the optimum time to deliver electrical energy to the capacitor storage devices for the recharging thereof. Preferably, recharging of the capacitor storage devices will take place during off-peak periods, however, other factors such as, for example, the charge level of the capacitor storage devices and the current cost of the electrical energy may also affect the decision to provide a recharge.

Preferably the control equipment 80 and central control device 90 employs a microprocessor to optimize the charging and discharging of the capacitor storage devices. For example, the central control device 90 may employ a microprocessor to monitor and analyze the fluctuating cost of electrical energy, and to make predictions on whether the cost will increase or decrease, and when. The microprocessor may also be used to assess the demand on a power grid, and to optimize the combined resources of a utility's power generating facilities and the electrical energy stored in capacitor-based storage systems of the present invention. Microprocessors may be used in the control equipment for monitoring the condition of the capacitor storage devices and indicating the status of the capacitor storage devices to the central control device 90. The microprocessors of the central control device 90 and the control equipment 80 may also communicate to determine the optimum time at which the discharging or recharging of the capacitor storage devices should occur.

When one or more capacitor storage devices are placed at a customer's location, as is contemplated by one embodiment of the present invention, the customer may receive a quantity of energy, such as a day's energy needs, preferably, although not necessarily, during non-peak hours. The present invention allows the packets of electrical energy to be scheduled for delivery to the capacitor storage devices so that power plant electrical energy generation can be leveled. For example, energy packet delivery can be scheduled for sleeping hours when other demand is low. In this manner, a utility can dramatically improve its operating efficiencies.

The capacitors of one embodiment of the present invention are now capable of storing electrical energy at a density in excess of 100 joules/cc. With a capacitor rating of 50 joules/cc, stored energy can reach levels of 50 kWh in a 130 cubic foot unit, which is about the size of a cube of 5 feet per side. Thus, at a storage density in excess of 100 joules/cc, the capacitor storage unit will be substantially less than 130 cubic feet in size. Substantially larger units may also be constructed to have substantially larger energy storage ratings. Proportionately larger capacitor storage devices may be used at businesses or may be installed in multiple quantities in an array to offer the same benefits on a larger scale. In another embodiment of the present invention, a "farm" of such capacitors may be installed near a power plant or power substation and used as a major source of stored energy to help supply an energy grid with power each day during peak demand times. Alternatively, such a farm of capacitors may be installed at a location distant from the power plant to help minimize the need for additional transmission line construction. Multiple energy packets may be delivered to the farm each night and the stored energy discharged each day into the utility's power grid as needed.

In addition to the electrical energy storage uses described above, it is foreseen that the system of the present invention may be used to provide electrical or other power to vehicles and other equipment. For example, the capacitor storage devices of the present invention may be used to power automobiles, trucks or light rail systems. In a light rail system, for example, the capacitor storage devices could be used to drive a train or tram from point A to point B and back in a repeating loop. During each stop at point A and point B, the capacitor storage devices could receive a charge of electrical power sufficient to ensure that enough electrical energy is available to get the train to the next point. In such a manner, no power distribution rails or lines would be required to be constructed between point A and point B.

As can be seen from the foregoing, the system of the present invention allows for the efficient, cost effective storage of large quantities of electrical energy. The system can have multiple uses, such as, for example, to provide electrical energy to support load leveling or peak shaving, to supply short term electrical energy to run a household, business or factory, or to provide for power quality management. The system of the present invention allows for electrical energy storage to be accomplished on a larger scale than has been previously possible, while also providing for a storage medium of compact size. While certain embodiments of the present invention are described in detail above, the scope of the invention is not to be considered limited by such disclosure, and modifications are possible without departing from the spirit of the invention as evidenced by the following claims.

What is claimed is:

1. An electrical energy distribution system, comprising:
   a source of electrical energy;
   at least one high energy storage capacitor connected to said source and further connected to a consumer energy usage network;
   an amount of electrical energy delivered from said source and stored at said at least one capacitor;
   discharged electrical energy from said at least one capacitor into said network; and
   another amount of electrical energy delivered from said source and stored at said at least one capacitor to recharge said capacitor after said capacitor has been at least partially discharged.

2. The system of claim 1, wherein said network is a consumer's home electrical wiring system.

3. The system of claim 1, wherein said network is a business office's electrical wiring system.

4. The system of claim 1, wherein said network is a part of an electrical power distribution grid connected to said source.

5. The system of claim 1, wherein said source is a fossil fuel power plant.

6. The system of claim 1, wherein said source is a nuclear power plant.

7. The system of claim 1, wherein said source is a hydro-electric power plant.

8. The system of claim 1, wherein said source is a solar power plant.

9. The system of claim 1, wherein said source is a wind power plant.

10. The system of claim 1, wherein said at least one capacitor is an electrochemical capacitor.

11. The system of claim 1, wherein said at least one capacitor is a cryogenic ceramic capacitor.

12. The system of claim 1, wherein said at least one capacitor is an electrolytic capacitor.

13. The system of claim 1, further comprising a device for converting AC electrical energy from said source into DC electrical energy for storage in said at least one capacitor.

14. The system of claim 1, further comprising a device for converting DC electrical energy stored in said at least one capacitor to AC electrical energy for delivery to a load.

15. The system of claim 1, wherein said at least one capacitor delivers DC electrical energy into said network to supply one or more DC loads in communication therewith.

16. The system of claim 1, further comprising control equipment for allowing communication between said source and said at least one capacitor, such that said at least one capacitor may be automatically charged by said source as needed.

17. The system of claim 1, wherein said electrical energy is delivered to said at least one capacitor during a period of low electrical energy demand on said source.

18. The system of claim 1, wherein said at least one capacitor has an energy storage capacity of at least 50 watt-hours.

19. The system of claim 18, wherein said at least one capacitor is charged at a first location, and discharged at one or more other locations.

20. The system of claim 1, wherein a packet of electrical energy required to recharge said at least one capacitor is released into said network by said source, said packet of electrical energy thereafter delivered to said at least one capacitor.

21. The system of claim 1, wherein said at least one capacitor has an energy storage density of at least 50 Joules per cubic centimeter.

22. The system of claim 20, wherein there is a difference between the time required for said source to release said packet of electrical energy into said network and the time required for said at least one capacitor to store said electrical energy.

23. The system of claim 20, wherein the entirety of said packet of electrical energy is released into said network at once.

24. The system of claim 20, wherein the entirety of said packet of electrical energy is released into said network over an extended period of time.

25. The system of claim 1, wherein said discharge of electrical energy is of short duration and is used to maintain power quality.

26. An electrical energy storage and distribution system, comprising:
   a source of electrical energy;
   at least one high energy storage capacitor connected to said source and further connected to an electrical energy distribution grid;
   a pathway for transferring an amount of electrical energy from said source to said at least one high energy storage capacitor for storage; and
   a pathway for delivering at least a portion of said electrical energy stored by said at least one high energy storage capacitor into said electrical energy distribution grid.

27. The system of claim 26, wherein said source is a fossil fuel burning power plant.

28. The system of claim 26, wherein said source is a nuclear power plant.

29. The system of claim 26, wherein said source is a hydro-electric power plant.

30. The system of claim 26, wherein said source is a solar power plant.

31. The system of claim 26, wherein said source is a wind power plant.

32. The system of claim 26, wherein said at least one capacitor is an electrochemical capacitor.

33. The system of claim 26, wherein said at least one capacitor is a cryogenic ceramic capacitor.

34. The system of claim 26, wherein said at least one capacitor is an electrolytic capacitor.

35. The system of claim 26, further comprising a device for converting AC electrical energy from said source into DC electrical energy for storage in said at least one capacitor.

36. The system of claim 26, further comprising a device for converting DC electrical energy stored in said at least one capacitor to AC electrical energy for delivery to a load.

37. The system of claim 26, further comprising control equipment for allowing communication between said source and said at least one capacitor, such that said at least one capacitor may be automatically charged by said source as deeded.

38. The system of claim 37, wherein said control equipment further allows stored electrical energy to be automatically discharged from said at least one capacitor into said electrical energy distribution grid in response to demand.

39. The system of claim 26, wherein said electrical energy is delivered to said at least one capacitor during a period of low electrical energy demand on said source.

40. The system of claim 26, wherein said at least one capacitor is located at or near said source.

41. The system of claim 26, wherein said at least one capacitor is portable, and may be transported to a location requiring additional electrical energy and connected to said location's electrical energy distribution grid.

42. The system of claim 26, wherein a multitude of capacitors are connected together to provide increased electrical energy storage capacity.

43. The system of claim 26, wherein said at least one capacitor is transportable.

44. The system of claim 43, wherein said at least one capacitor is charged at a first location, and discharged at one or more other locations.

45. The system of claim 26, wherein a packet of electrical energy of a size required to recharge said at least one capacitor is released into said pathway by said source, said packet of electrical energy thereafter delivered to said at least one capacitor.

46. The system of claim 45, wherein there is a delay between the release of said packet of electrical energy into said pathway by said source and the delivery of said packet of electrical energy to said at least one capacitor.

47. The system of claim 45, wherein there is a difference between the time required for said source to release said packet of electrical energy into said pathway and the time required for said at least one capacitor to store said electrical energy.

48. The system of claim 45, wherein the entirety of said packet of electrical energy is released into said pathway substantially at once.

49. The system of claim 45, wherein the entirety of said packet of electrical energy is released into said pathway over an extended period of time.

50. A method of storing and distributing electrical energy to effect electrical power load leveling, said method comprising:

providing a source of electrical energy;

providing at least one high energy storage capacitor capable of storing a significant amount of electrical energy sufficient to power a plurality of devices simultaneously, through a consumer energy usage network, said at least one high energy storage capacitor in communication with said source;

supplying an amount of electrical energy to said at least one high energy storage capacitor to charge said at least one high energy storage capacitor during a period of low electrical energy demand on said source;

discharging at least a portion of said electrical energy stored in said at least one high energy storage capacitor to a load supplied by said source, during a period of high demand on said source; and repeatedly charging and discharging said at least one high energy storage capacitor during periods of low and high electrical energy demand respectively.

51. The method of claim 50, further comprising an electrical energy distribution network in communication with said at least one capacitor.

52. The method of claim 50, wherein said at least one capacitor is located at a residence.

53. The method of claim 50, wherein said at least one capacitor is located at a business.

54. The method of claim 50, wherein said at least one capacitor is located at or near said source.

55. The method of claim 50, wherein said electrical energy distribution network resides in a residence and is adapted to transport electrical energy from said at least one capacitor to at least one load located therein.

56. The method of claim 50, wherein said electrical energy distribution network resides in a business and is adapted to transport electrical energy from said at least one capacitor to at least one load located therein.

57. The method of claim 50, wherein said electrical energy distribution network is a part of an electrical energy distribution grid provided to transport electrical energy from said source to its customers.

58. The method of claim 57, wherein said at least one capacitor is designed to store an amount of electrical energy for later introduction into said electrical energy distribution grid.

59. The method of claim 50, wherein said at least one capacitor is designed to store and later provide at least a portion of the electrical energy required by at least one specific load.

60. The method of claim 50, wherein said at least one capacitor is portable and may be transported to a location where load leveling is needed, said at least one capacitor adapted for connection to an electrical energy distribution grid in communication with said source.

61. The method of claim 60, wherein said at least one capacitor is charged at a first location, and discharged at one or more other locations.

62. The method of claim 50, further comprising converting AC electrical energy from said source into DC electrical energy for storage by said at least one capacitor.

63. The method of claim 50, further comprising converting DC electrical energy from said at least one capacitor into AC electrical energy for delivery to a load.

64. The method of claim 50, further comprising providing control equipment for allowing communication between said source and said at least one capacitor, such that said at least one capacitor may be automatically charged and discharged as needed.

65. The system of claim 50, wherein a packet of electrical energy of a size required to recharge said at least one capacitor is released by said source, said packet of electrical energy thereafter delivered to said at least one capacitor.

66. The system of claim 65, wherein there is a delay between the release of said packet of electrical energy by said source and the delivery of said packet of electrical energy to said at least one capacitor.

67. The system of claim 66, wherein there is a difference between the time required for said source to release said packet of electrical energy and the time required for said at least one capacitor to store said electrical energy.

68. The system of claim 66, wherein the entirety of said packet of electrical energy is released by said source substantially at once.

69. The system of claim 66, wherein the entirety of said packet of electrical energy is released by said source over an extended period of time.

* * * * *